(12) United States Patent
Kim et al.

(10) Patent No.: US 10,840,780 B2
(45) Date of Patent: Nov. 17, 2020

(54) MOTOR WITH BRUSHES AT ANGULAR INTERVAL OF 63° TO 66° AND HAVING A WIDTH AND A COMMUTATOR PIECE WITH A WIDTH

(71) Applicant: LG INNOTEK CO., LTD., Seoul (KR)

(72) Inventors: Jae Young Kim, Seoul (KR); Hong Hyoun Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 166 days.

(21) Appl. No.: 15/778,065

(22) PCT Filed: Nov. 29, 2016

(86) PCT No.: PCT/KR2016/013836
§ 371 (c)(1),
(2) Date: May 22, 2018

(87) PCT Pub. No.: WO2017/095102
PCT Pub. Date: Jun. 8, 2017

(65) Prior Publication Data
US 2018/0367013 A1    Dec. 20, 2018

(30) Foreign Application Priority Data

Dec. 1, 2015    (KR) .................... 10-2015-0170241

(51) Int. Cl.
*H02K 13/10*    (2006.01)
*H01R 39/18*    (2006.01)
(Continued)

(52) U.S. Cl.
CPC ............. *H02K 13/10* (2013.01); *H01R 39/18* (2013.01); *H02K 1/17* (2013.01); *H02K 1/24* (2013.01); *H02K 2213/03* (2013.01)

(58) Field of Classification Search
CPC ........ H02K 13/10; H02K 5/148; H02K 5/143; H02K 1/24; H02K 1/17; H02K 2213/03;
(Continued)

(56) References Cited

U.S. PATENT DOCUMENTS 3,277,324 A    10/1966    Beaudoin et al.
4,983,873 A *   1/1991    Tanaka ................... H01R 39/26
                                                    310/233

(Continued)

FOREIGN PATENT DOCUMENTS

CN    101826695 A    9/2010
CN    102422513 A    4/2012
(Continued)

OTHER PUBLICATIONS

CN-104518595-B Description in English.*
(Continued)

*Primary Examiner* — Maged M Almawri
(74) *Attorney, Agent, or Firm* — Saliwanchik, Lloyd & Eisenschenk

(57) ABSTRACT

The present invention provides a stator including magnets having six poles; a rotor disposed inside the stator and including thirteen slots; a coil wound around the slot; a rotary shaft coupled to the rotor; a commutator coupled to the rotary shaft and connected to the coil; and a plurality of brushes disposed to be pressed against the commutator and located to have an angular interval of 63° to 66° in the circumferential direction of the rotary shaft, thereby providing advantageous effects in that a current ripple is minimized and a torque is maximized.

7 Claims, 6 Drawing Sheets

(51) Int. Cl.
*H02K 1/17* (2006.01)
*H02K 1/24* (2006.01)

(58) Field of Classification Search
CPC ...... H02K 13/105; H02K 13/00; H02K 13/04; H01R 39/18; H01R 39/20; H01R 39/06; H01R 39/64; H01R 39/60; H01R 39/62
USPC .................................................. 310/233–249
See application file for complete search history.

(56) References Cited

U.S. PATENT DOCUMENTS

| | | | | |
|---|---|---|---|---|
| 5,128,577 | A * | 7/1992 | Kobayashi | H02K 13/006 310/233 |
| 7,109,628 | B2 * | 9/2006 | Yamamoto | H02K 13/10 310/220 |
| 7,423,405 | B2 * | 9/2008 | Okai | F02K 3/04 310/154.03 |
| 8,686,612 | B2 * | 4/2014 | Roos | H02K 13/10 310/233 |
| 2007/0152532 | A1 | 7/2007 | Roos et al. | |
| 2011/0140554 | A1 | 6/2011 | Wong et al. | |
| 2011/0169370 | A1 * | 7/2011 | Roos | H02K 13/10 310/238 |
| 2011/0187225 | A1 | 8/2011 | Bayer et al. | |
| 2012/0133240 | A1 | 5/2012 | Roos et al. | |
| 2015/0288119 | A1 * | 10/2015 | Ichikawa | H02K 13/006 310/236 |

FOREIGN PATENT DOCUMENTS

| | | | |
|---|---|---|---|
| CN | 104518595 | A | 4/2015 |
| CN | 104518595 | B * | 4/2017 |
| JP | 2008-079451 | A | 4/2008 |
| KR | 10-2011-0069012 | A | 6/2011 |
| KR | 10-2015-0034504 | A | 4/2015 |
| KR | 10-1568665 | B1 | 11/2015 |

OTHER PUBLICATIONS

JP2008079451 English Translation.*
Supplementary European Search Report dated Sep. 6, 2018 in European Application No. 16870998.8.
International Search Report in International Application No. PCT/KR2016/013836, filed Nov. 29, 2016.
Office Action dated Apr. 14, 2020 in Chinese Application No. 201680069708.X.

* cited by examiner

MOTOR WITH BRUSHES AT ANGULAR INTERVAL OF 63° TO 66° AND HAVING A WIDTH AND A COMMUTATOR PIECE WITH A WIDTH

CROSS-REFERENCE TO RELATED APPLICATIONS

This application is the U.S. national stage application of International Patent Application No. PCT/KR2016/013836, filed Nov. 29, 2016, which claims priority to Korean Application No. 10-2015-0170241, filed Dec. 1, 2015, the disclosures of each of which are incorporated herein by reference in their entirety.

TECHNICAL FIELD

The present invention relates to a motor and a vehicle including the same.

BACKGROUND ART

A motor includes a rotary shaft formed to be rotatable, a rotor coupled to the rotary shaft, and stators fixed inside a housing. The stators are installed along a circumference of the rotor and spaced a distance from each other. Rotation of the rotor is induced due to an electrical interaction in the motor. In a case in which coils are wound around the rotor, a commutator and a brush are provided for supplying a current to the coils wound around the rotating rotor.

Generally, the commutator is coupled to the rotary shaft to be rotated while being coupled to the coils, and brushes are coupled to the housing and disposed to be in contact with the commutator. Here, the brushes are in contact with the commutator to supply a current to the commutator.

Meanwhile, the stator may include magnets, and the magnets may have six poles. In addition, thirteen slots of a rotor around which coils are wound may be provided. In the case of a direct current (DC) motor having six poles and thirteen slots, power may be supplied to a rotor through two brushes, and two parallel circuits may be formed in the rotor. Generally, in the case of a motor including magnets having six poles, two brushes may be disposed to have an angular interval of 60° about the rotary shaft.

However, since the number of short-circuited coils of such a motor which has the six poles and the thirteen slots is increased, an amount of a ripple component of current is increased. When the amount of the ripple component of the current is increased, there is a problem in that an amount of a ripple component of a torque is also increased.

DISCLOSURE

Technical Problem

The present invention is directed to providing a six pole and thirteen slot motor in which a brush is disposed such that a current ripple is minimized and a torque is maximized, and a vehicle including the same.

Objectives of the present invention are not limited to the above-described objectives, and the other objectives which are not described above will be clearly understood to those skilled in the art through the following specification.

Technical Solution

One aspect of the present invention provides a motor including a rotary shaft, a rotor including a hole in which the rotary shaft is disposed, a stator disposed on an outer side of the rotor, a commutator including a hole in which the rotary shaft is disposed, and brushes configured to be in contact with the commutator, wherein the stator includes magnets having six poles, the rotor includes thirteen slots, and the plurality of brushes are located to have an angular interval of 63° to 66° in a circumferential direction of the rotary shaft.

The stator may include three divided cores, each including a magnet having two poles.

An angular interval between reference lines connecting centers of contact areas between the brushes and the commutator and a center of the rotary shaft may range from 63° to 66° in the circumferential direction.

A width of the brush in the circumferential direction may be a length of an arc of the brush corresponding to 22° to 26° about a center of the rotary shaft.

A width of a piece of the commutator in the circumferential direction may be a length of an arc of the commutator piece corresponding to 27.7° about a center of the rotary shaft.

The motor may further include a housing configured to accommodate the rotor and the stator, wherein the housing includes a cover plate, and the brush is disposed on the cover plate.

Another aspect of the present invention provides a vehicle including a motor, wherein the motor includes a rotary shaft, a rotor including a hole in which the rotary shaft is disposed, a stator disposed on an outer side of the rotor, a commutator including a hole in which the rotary shaft is disposed, and brushes configured to be in contact with the commutator, wherein the stator includes magnets having six poles, the rotor includes thirteen slots, and the plurality of brushes are located to have an angular interval of 63° to 66° in a circumferential direction of the rotary shaft.

Advantageous Effects

According to the embodiments, in a motor including a stator including magnets having six poles and a rotor having thirteen slots, since brushes are disposed to have an angular interval of 63° to 66°, there are advantageous effects in that a current ripple is minimized and a torque maximized.

MODES OF THE INVENTION

Hereinafter, exemplary embodiments of the present invention will be described in detail with reference to the accompanying drawings. Purposes, specific advantages, and novel features of the present invention will be clear from the exemplary embodiments and the following detailed descriptions in connection with the accompanying drawings. Terms and words used in this specification and claims are not to be interpreted as limited to commonly used meanings or meanings in dictionaries and should be interpreted with meanings and concepts which are consistent with the technological scope of the present invention based on the principle that the inventor has appropriately defined concepts of terms in order to describe the present invention in the best way. In addition, in descriptions of the present invention, when it is determined that detailed descriptions of related well-known functions unnecessarily obscure the gist of the present invention, the detailed descriptions will be omitted.

Figure 1:
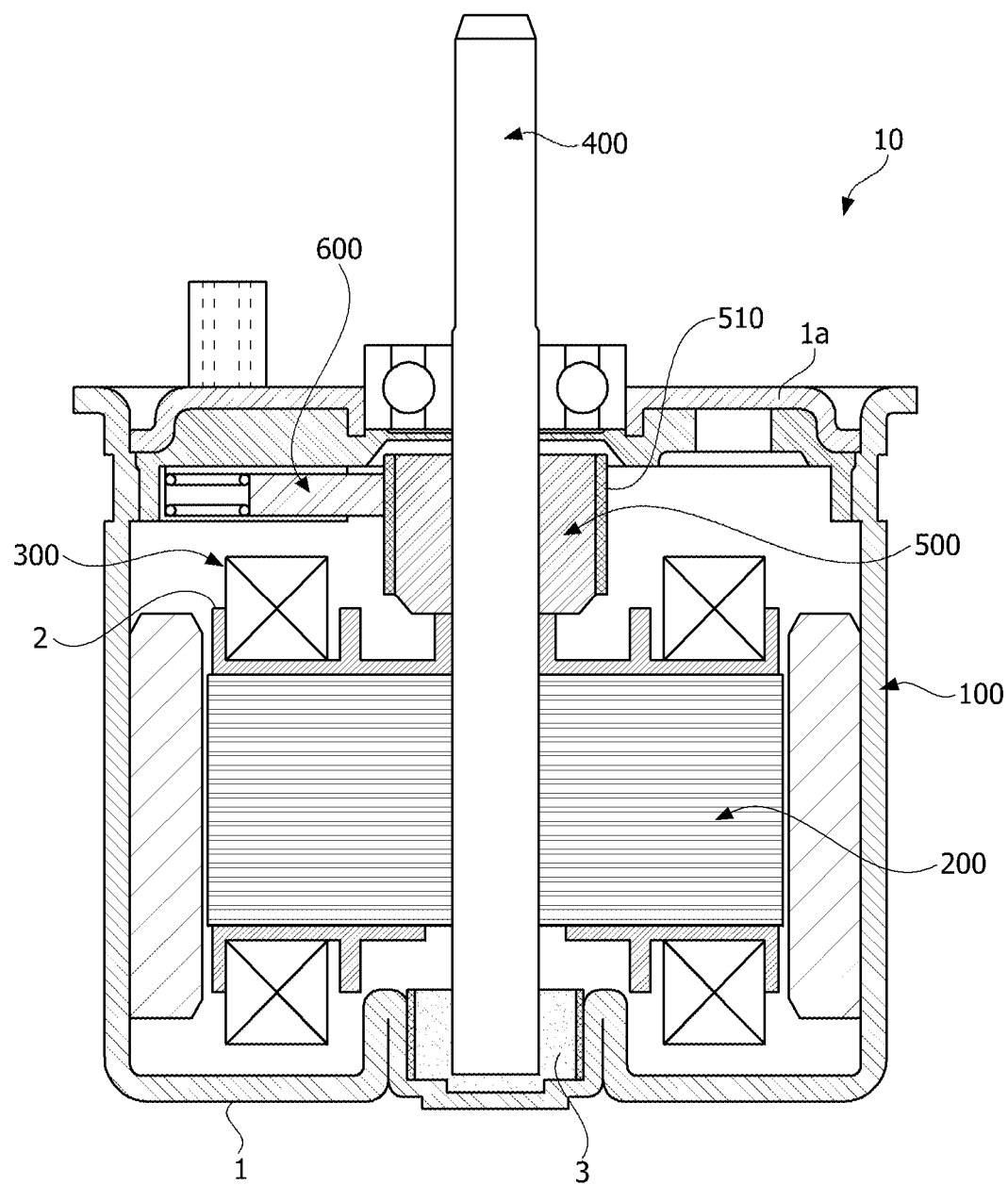
FIG. 1 is a view illustrating a motor according to an embodiment.
Figure 2:
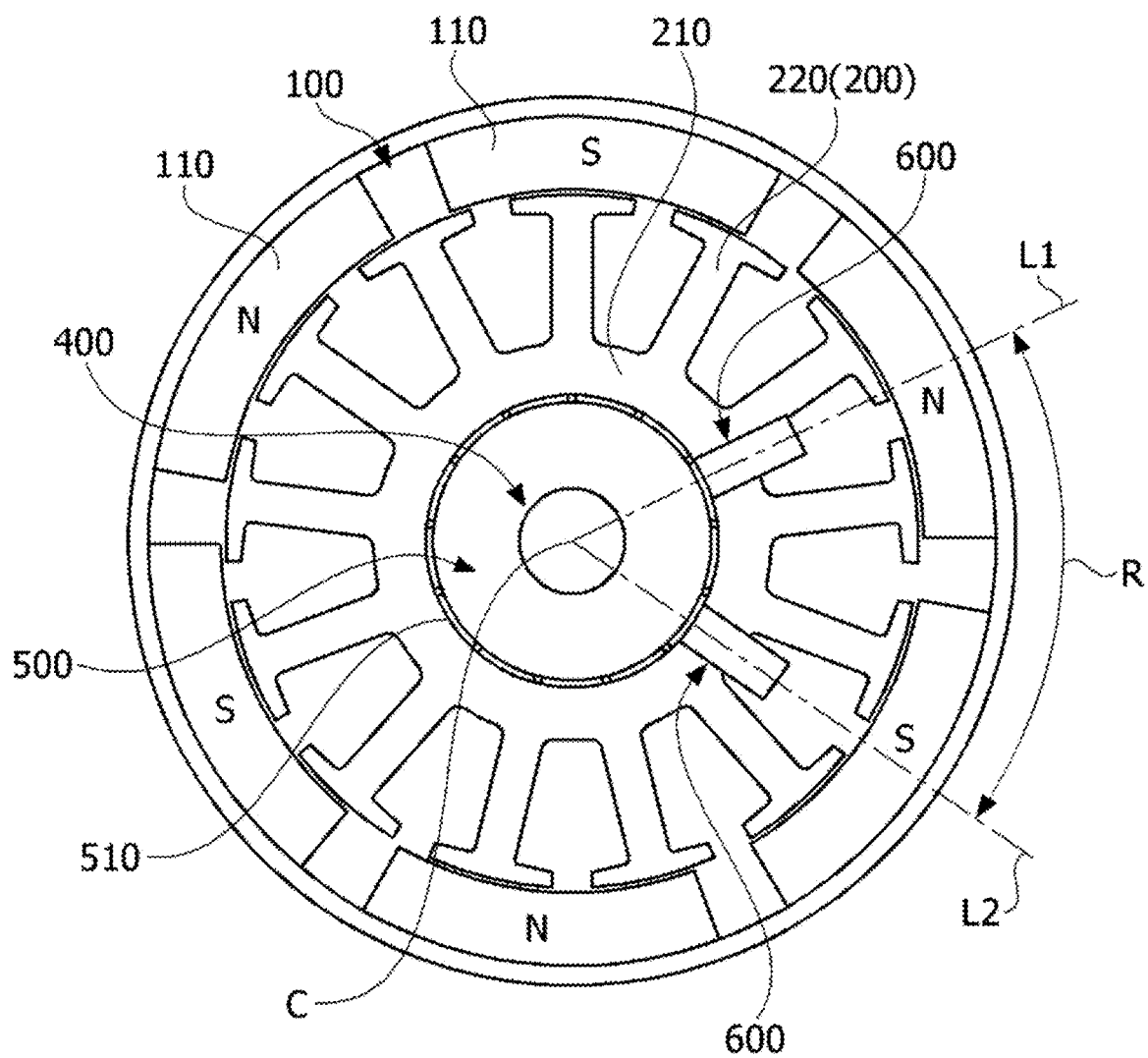
FIG. 2 is a view illustrating a stator and a rotor of the motor illustrated in FIG. 1.

FIG. 1 is a view illustrating a motor according to one exemplary embodiment of the present invention, and FIG. 2 is a view illustrating a stator and a rotor of the motor illustrated in FIG. 1. Here, FIGS. 1 and 2 are views clearly illustrating main features of the motor for clearly and conceptually understanding the present invention, and as a result, various changes in the drawings may be predicted, and the scope of the present invention need not be limited by specific shapes illustrated in the drawings.

Referring to FIGS. 1 and 2, a motor 10 according to the present invention may include a stator 100, a rotor 200, a coil 300, and a rotary shaft 400.

The stator 100 may be coupled to an inner side of a housing 1 and include a plurality of magnets 110. The magnets 110 and a coil wound around the rotor 200 generate a rotating magnetic field. The magnets 110 may include six magnets, of which an N-pole and an S-pole may be alternately disposed around the rotary shaft 400 in a circumferential direction of the rotary shaft 400. Meanwhile, the stator 100 may be formed by coupling a plurality of divided cores, or may be formed as one core. In one embodiment, the stator 100 of the motor may be formed by coupling three divided cores each including the magnet 110 having the N-pole and the S-pole.

The rotor 200 is disposed inside the stator 100. The rotor 200 may include a core 210 having a center coupled to the rotary shaft 400, and slots 220 which are formed in a circumferential surface of the core 210 and around which coils 300 are wound. The slots 220 are disposed to face the stator 100, and thirteen slots 220 may be provided.

The coil 300 is wound around each of the slots 220. An insulator 2 is installed in the slot 220 to insulate the slot 220 from the coil 300.

When a current is supplied to the coil 300, an electrical interaction is induced between the stator 100 and the magnet 110 so that the rotor 200 is rotated. In a case in which the rotor 200 is rotated, the rotary shaft 400 is also rotated. Here, the rotary shaft 400 may be supported by a bearing 3.

Meanwhile, in order to supply a current to the rotating rotor 200, a commutator 500 and brushes 600 are needed.

The commutator 500 is coupled to the rotary shaft 400. In addition, the commutator 500 may be disposed above the rotor 200. The commutator 500 may include commutator pieces 510 on a circumferential surface thereof. In addition, the commutator pieces 510 are electrically connected to the coils 300. Meanwhile, the brush 600 is in contact with the commutator piece 510 to apply an external driving signal to the coil 300. Thirteen commutator pieces 510 may be disposed along a circumference of the commutator 500 to correspond to the thirteen slots 220 of the rotor 200.

The brush 600 is disposed to be pressed against the commutator 500. The brush 600 may be installed in the housing 1. Two brushes 600 may be provided, but the present invention is not limited thereto. Two brushes 600 may be disposed to have an angular interval of 63° to 66°.

The housing 1 includes a cover plate 1a. The cover plate 1a covers an open upper portion of the housing 1. The brush 600 is installed at a lower surface of the cover plate 1a.

Figure 3:
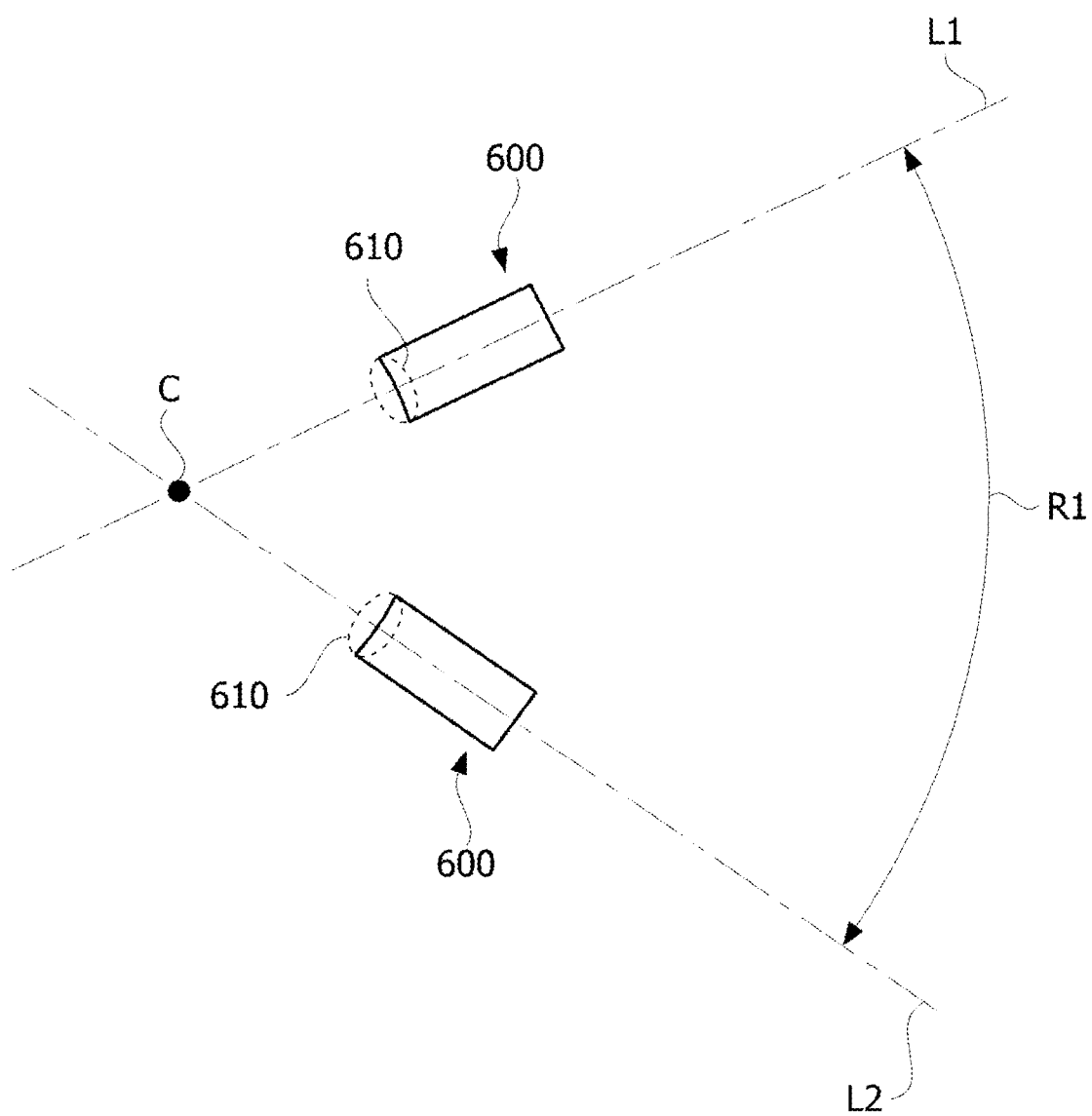
FIG. 3 is a view illustrating brushes disposed to have an angular interval of 63° to 66°.

FIG. 3 is a view illustrating brushes disposed to have an angular interval of 63° to 66°.

Specifically, referring to FIGS. 2 and 3, two brushes 600 may be disposed to have an angular interval of 63° to 66° in a circumferential direction of the rotary shaft 400. When reference lines which pass a center C of the rotary shaft 400 (see FIG. 2) and centers of the brushes 600 are referred to as L1 and L2 of FIG. 2, two brushes 600 may be disposed such that an angle R1 between L1 and L2 ranges from 63° to 66° in the circumferential direction.

Here, the center of the brush 600 may be referred to as a center of a contact area 610 (hereinafter, a brush width) of the brush 600 in contact with the commutator 500 in the circumferential direction when the rotary shaft 400 is a center as illustrated in FIG. 3.

As an example, the brush 600 may have a rectangular shape having a cross section in a quadrangular shape and may be installed in the housing 1 using a separate holder or may be fused and fixedly installed.

Figure 4:
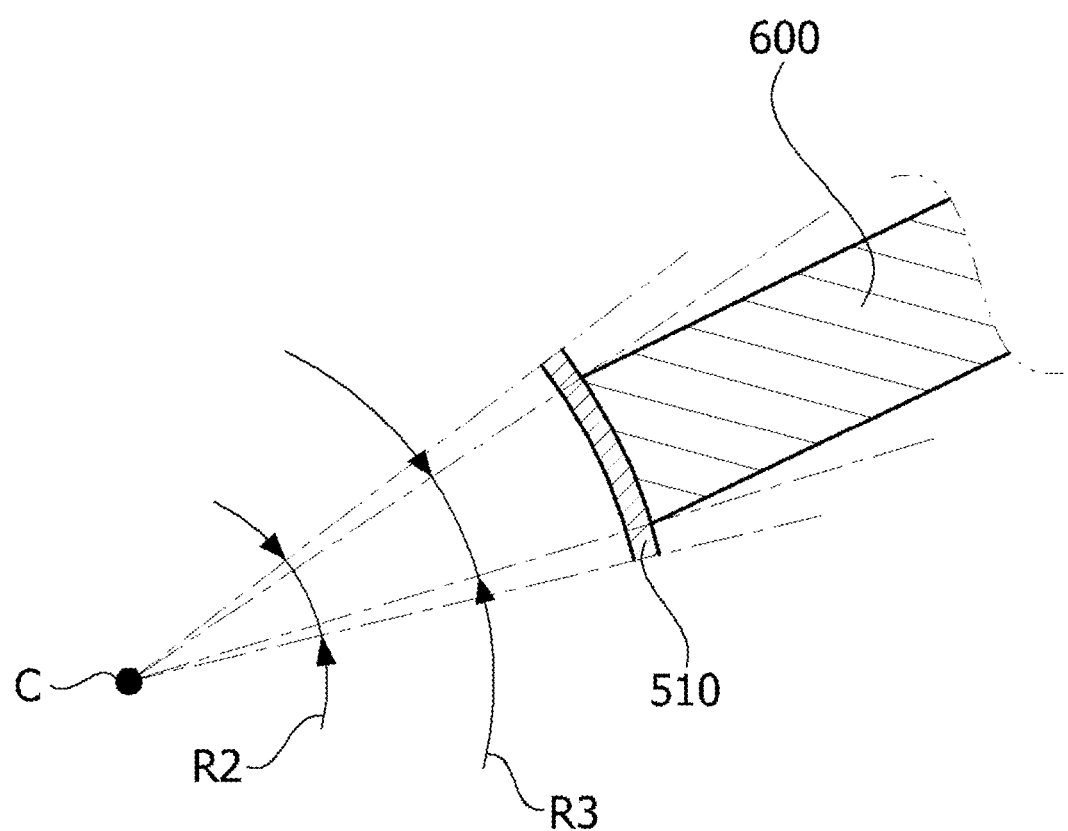
FIG. 4 is a view illustrating a width of a brush and a width of a commutator piece.

FIG. 4 is a view illustrating a width of a brush and a width of a commutator piece.

Referring to FIG. 4, in the motor including thirteen slots 220 and the magnets 110 having six poles, when the brushes 600 are disposed to have an angular interval of 63° to 66°, a width of the commutator piece 510 may correspond to a length of an arc corresponding to a central angle R2 of 27.7° about a center C of the rotary shaft 400 (see FIG. 4), and a width of the brush may correspond to a length of an arc corresponding to a central angle R3 of 22° to 26 about the center C of the rotary shaft 400 (see FIG. 4).

For example, in the motor including thirteen slots 220 and the magnets 110 having six poles, when a width of the motor corresponds to a length of an arc corresponding to 22° to 26°, the width of the brush may correspond to 3.7 mm to 4.4 mm.

Figure 5:
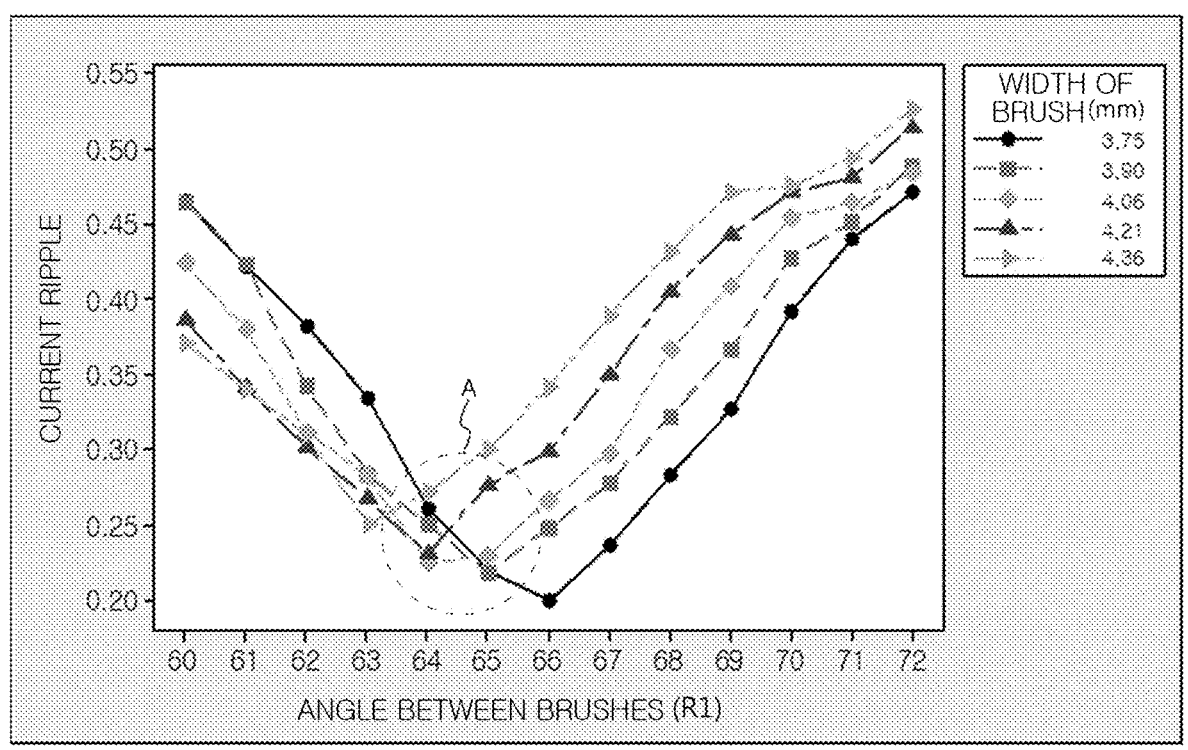
FIG. 5 is a graph showing a change in a current ripple when an angle between brushes is in the range of 63° to 66°.

FIG. 5 is a graph showing a change in a current ripple when an angle between brushes is in the range of 63° to 66°.

Referring to FIG. 5, in the motor including thirteen slots 220 and the magnets 110 having six poles, when a current ripple is measured in cases in which a width of the brush is 3.75 mm, 3.90 mm, 4.06 mm, 4.21 mm, and 4.36 mm, a change in a current ripple is minimized when the angle R1 of the brushes 600 is in the range of 63° to 66° as shown in A of FIG. 5.

Figure 6:
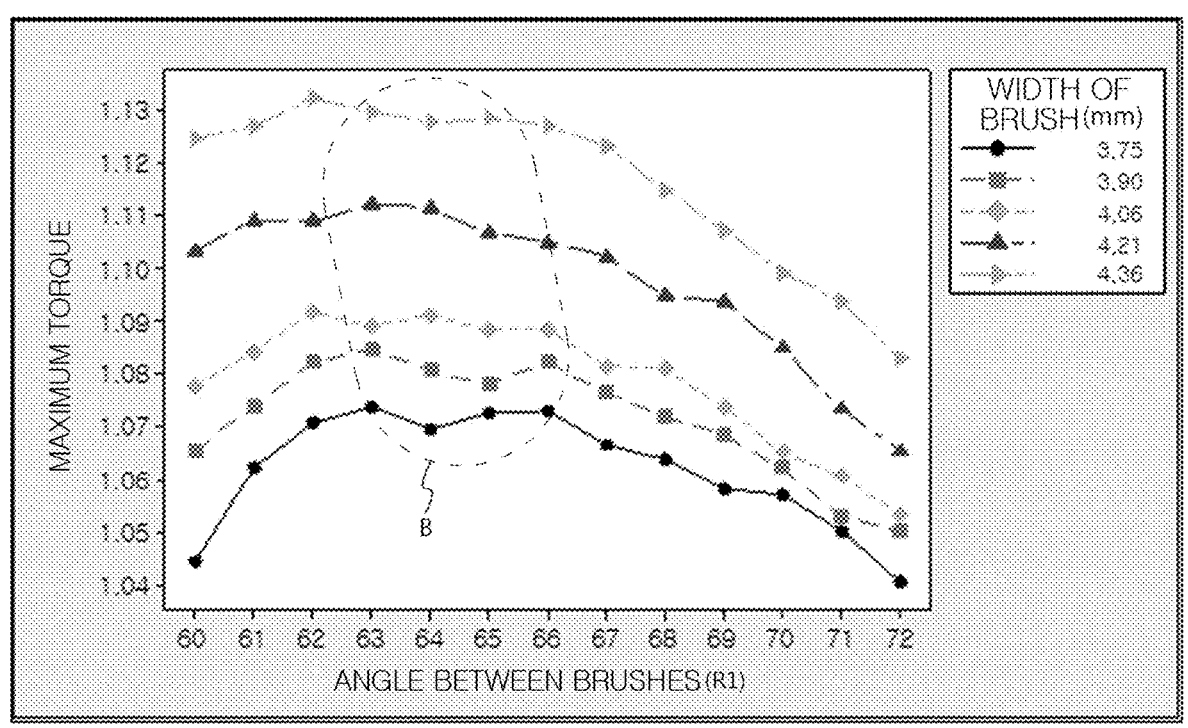
FIG. 6 is a graph showing a maximum torque when the angle between the brushes is in the range of 63° to 66°.

FIG. 6 is a graph showing a maximum torque when the angle between the brushes is in the range of 63° to 66°.

Referring to FIG. 6, in the motor including thirteen slots 220 and the magnets 110 having the six poles, when a maximum torque is measured in cases in which the width of the brush is 3.75 mm, 3.90 mm, 4.06 mm, 4.21 mm, and 4.36 mm, the maximum torque is maximized when the angle R1 of the brush 600 is in the range of 63° to 66° as illustrated in B of FIG. 6.

As described above, the motor and a vehicle including the same has been specifically described with reference to the accompanying drawings.

While the technical spirit of the present invention has been particularly described with reference to exemplary embodiments, various changes, modifications, and substitutions may be made by those of skilled in the art without departing from the essential aspects of the present invention. Therefore, the specified exemplary embodiments and drawings should be considered in a descriptive sense only and not for purposes of limitation, and the technical scope of the present invention is not defined by the embodiments and the accompanying drawings. The scope of the present invention is defined by the appended claims, and encompasses all technical spirits that fall within the equivalent scope of the appended claims.

REFERENCE NUMERALS

| 10: MOTOR | 100: STATOR |
|---|---|
| 110: MAGNET | 200: ROTOR |
| 210: CORE | 300: COIL |
| 400: ROTARY SHAFT | |

The invention claimed is:

1. A motor comprising:
a rotary shaft;
a rotor including a hole in which the rotary shaft is disposed;
a stator disposed on an outer side of the rotor;
a commutator including a hole in which the rotary shaft is disposed; and
two brushes configured to be in contact with the commutator,
wherein the stator includes magnets having six poles,
the rotor includes thirteen slots,
the brushes are located to have an angular interval of 63° to 66° in a circumferential direction of the rotary shaft, and
a width of each of the brushes in the circumferential direction is a length of an arc of the brush corresponding to 22° to 26° with respect to a center of the rotary shaft.

2. The motor of claim 1, further comprising a housing configured to accommodate the rotor and the stator,
wherein the housing includes a cover plate, and
the brush is disposed on the cover plate.

3. The motor of claim 1, wherein the stator includes three divided cores, each including a magnet having two poles.

4. The motor of claim 3, wherein an angular interval between reference lines connecting centers of contact areas between the brushes and the commutator and a center of the rotary shaft ranges from 63° to 66° in the circumferential direction.

5. The motor of claim 3, wherein a width of a commutator piece in the circumferential direction is a length of an arc of the commutator piece corresponding to 27.7° with respect to a center of the rotary shaft.

6. A vehicle comprising a motor,
wherein the motor includes:
a rotary shaft;
a rotor including a hole in which the rotary shaft is disposed;
a stator disposed on an outer side of the rotor;
a commutator including a hole in which the rotary shaft is disposed; and
two brushes configured to be in contact with the commutator,
wherein the stator includes magnets having six poles,
the rotor includes thirteen slots,
the brushes are located to have an angular interval of 63° to 66° in a circumferential direction of the rotary shaft, and
a width of each of the brushes in the circumferential direction is a length of an arc of the brush corresponding to 22° to 26° with respect to a center of the rotary shaft.

7. A motor comprising:
a rotary shaft;
a rotor including a hole in which the rotary shaft is disposed;
a stator disposed on an outer side of the rotor;
a commutator including a hole in which the rotary shaft is disposed; and
two brushes configured to be in contact with the commutator,
wherein the stator includes magnets having six poles,
the rotor includes thirteen slots,
the brushes are located to have an angular interval of 63° to 66° in a circumferential direction of the rotary shaft,
a width of each of the brushes in the circumferential direction is a length of an arc of the brush corresponding to 22° to 26° with respect to a center of the rotary shaft, and
a width of the brush ranges from 3.7 mm to 4.4 mm.

* * * * *